(12) United States Patent
Farrell et al.

(10) Patent No.: US 6,376,801 B1
(45) Date of Patent: Apr. 23, 2002

(54) GAS TURBINE COMPONENT REFURBISHMENT APPARATUS AND REPAIR METHOD

(75) Inventors: Brian Harlow Farrell, Amsterdam, NY (US); Aaron Todd Frost, Lewisville; James A. Morin, Humble, both of TX (US); Thaddeus Jan Strusinski, Nassau, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/686,900

(22) Filed: Oct. 12, 2000

(51) Int. Cl.$^7$ ................................................. B23K 9/12
(52) U.S. Cl. ..................... 219/124.34; 901/42
(58) Field of Search .................... 219/124.34, 125.1, 219/137 R; 901/42

(56) References Cited

U.S. PATENT DOCUMENTS

| | | | |
|---|---|---|---|
| 4,878,953 A | | 11/1989 | Saltzman et al. |
| 4,959,523 A | * | 9/1990 | Fihey et al. ............ 219/124.34 |
| 5,319,179 A | * | 6/1994 | Joecks et al. ........... 219/137 R |
| 5,545,873 A | * | 8/1996 | Sauer ....................... 219/125.1 |

* cited by examiner

*Primary Examiner*—Clifford C. Shaw
(74) *Attorney, Agent, or Firm*—Nixon & Vanderhye P.C.

(57) ABSTRACT

A gas turbine component can be refurbished and/or repaired with an arc welding process that is used in conjunction with a 6-axis robot, a camera and a robot controller/vision processor. Applied to a wire fed plasma welding process, the vision system identifies the part, constructs a weld path based on the part's individual contour, and calculates a trajectory (with or without sinusoidal oscillation) for the robot arm to follow.

11 Claims, 2 Drawing Sheets

GAS TURBINE COMPONENT REFURBISHMENT APPARATUS AND REPAIR METHOD

BACKGROUND OF THE INVENTION

The present invention relates to refurbishment and repair of gas turbine components and, more particularly, to an apparatus and method utilizing a multi-axis robotic arm welder for refurbishing and repairing gas turbine components.

Nickel-base, cobalt-base, and iron-base superalloys have been used in the hot sections of gas turbine engines due to their ability to withstand high operating temperatures while retaining significant strength at up to 80% of the alloy's melting temperature. Because these alloys are used to such extremes, they tend to suffer different types of damage in operation such as thermal fatigue, oxidation, corrosion, creep, etc. It is often desirable to repair the components rather than replace them due to economic concerns.

Manual use of arc-welding processes such as TIG (Tungsten Inert Gas), MIG (Metal Inert Gas), and PTA (Plasma Transferred Arc) has been performed in the weld repair of gas turbine components. However, as the performance of gas turbine engines increases, use of highly alloyed (increased gamma) ni-base superalloys (including directionally solidified and single crystal) has been required. This class of alloys has found popular use in large frame size industrial gas turbines. Examples include alloys such as GTD-222, IN-939, IN-738, GTD-111 (EA & DS), Mar-M-247 (DS), CMSX-4(SC), and Rene N5 (SC). These alloys, however, also become less weldable or even nearly impossible to weld manually as they are alloyed to the highest strength levels.

Manual TIG welding can be successful with the use of weld fillers like IN-625 and Hast X in low restraint weld geometries and a highly skilled welder. These weld fillers, however, tend to exhibit poor oxidation and creep resistances at the higher temperatures at which today's modern industrial gas turbines operate. Moreover, even if manual welding is successful, it is difficult to control a multiple pass, three-dimensional manual weld at the tip of a turbine blade (a typical repair location at the first engine overhaul). These geometrical inconsistencies of a manual weld such as a squealer tip wall thickness lead to increased machining or hand grinding times as well as decreased yield at subsequent inspection operations such as FPI (fluorescent penetrant inspection) and X-Ray.

BRIEF SUMMARY OF THE INVENTION

In an exemplary embodiment of the invention, a gas turbine component refurbishment apparatus includes a robotic arm disposed adjacent the gas turbine component, and a welding torch assembly coupled to an end of the robotic arm. A wire feeder cooperates with the welding torch assembly. A robotic arm controller communicates with the robotic arm and controls a position of the robotic arm relative to the gas turbine component. A vision system is coupled with the robotic arm controller for identifying the gas turbine component, defining a weld path according to the gas turbine component contour, and calculating a trajectory for the robotic arm to follow. The vision system communicates the trajectory to the robotic arm. The welding torch preferably includes an arc length voltage controller, a wire feed guide, and a plasma welding torch. The weld path may be provided with a sine wave with a set wavelength and a set amplitude to reduce heat input and to provide a weld width sufficient for the gas turbine component. The apparatus may further include a water-cooled chill fixture that secures the gas turbine component for welding and effects inter-pass temperature control. The robotic arm is preferably a 6-axis robotic arm.

In another exemplary embodiment of the invention, a method of refurbishing a gas turbine component includes the steps of securing the gas turbine component, identifying the gas turbine component, defining a weld path according to the gas turbine component contour, calculating a trajectory for the robotic arm to follow, and welding with the robotic arm and attached welding torch assembly along the weld path. The method may further include welding with an alloy weld filler wire. After the welding step, the method may include the steps of machining the gas turbine component to final dimensions, vacuum heat treating the gas turbine component, and inspecting the gas turbine component. Prior to the securing step, the method may include the step of heat treating the gas turbine component for welding. In this context, the welding step may be performed at room temperature.

DETAILED DESCRIPTION OF THE INVENTION

Figure 1:
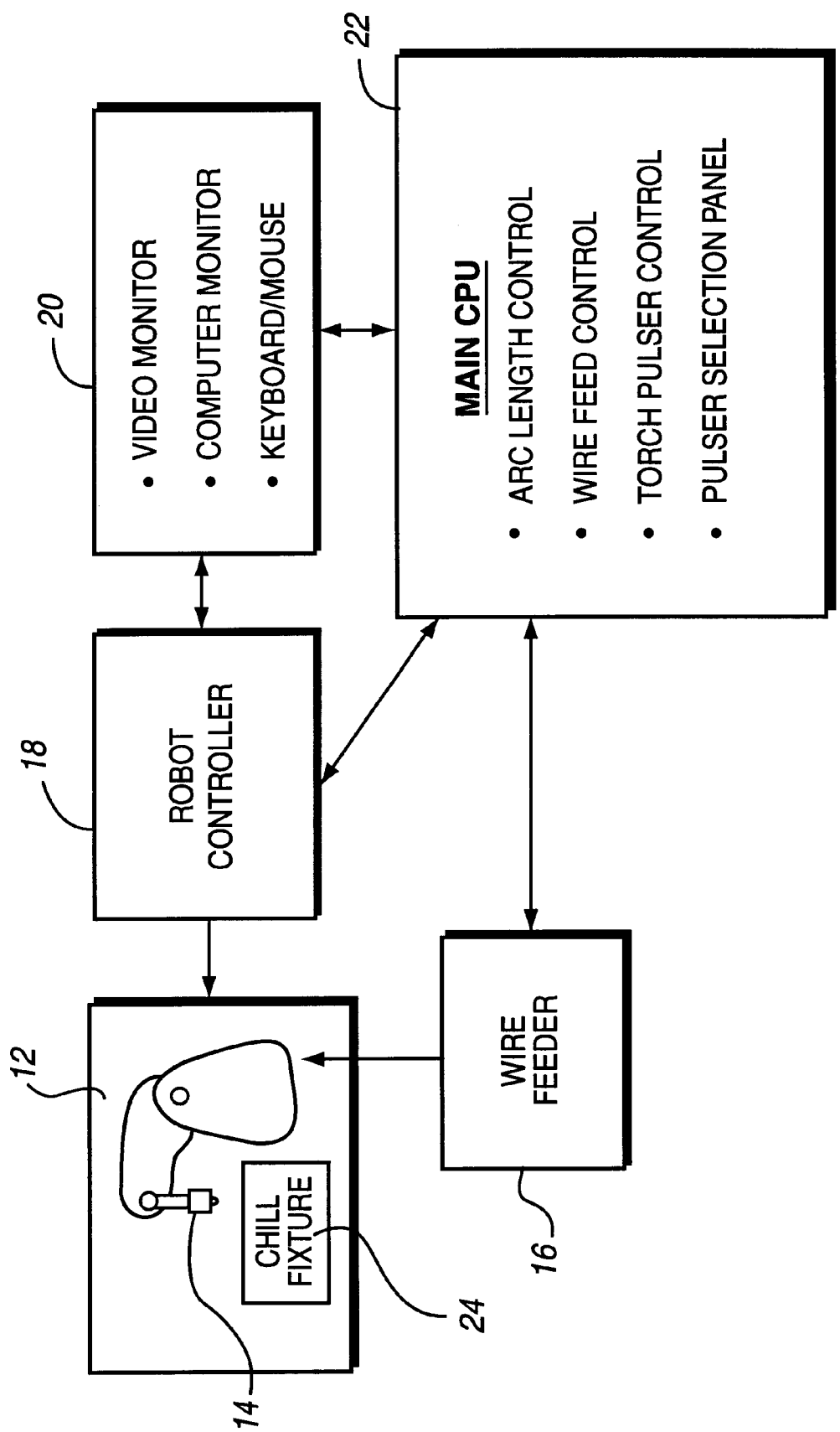
FIG. 1 is a block diagram of the apparatus of the present invention.

Referring to FIG. 1, the apparatus of the present invention includes a robotic arm 12, a welding torch assembly 14 coupled to an end of the robotic arm 12, and a wire feeder 16 cooperating with the welding torch assembly 14. A robotic arm controller 18 communicates with the robotic arm and controls a position of the robotic arm relative to the gas turbine component to be refurbished/repaired. A vision system 20 including a video monitor, computer monitor and input device such as a keyboard and/or mouse is coupled with the robotic arm controller 18. The vision system 20 identifies the gas turbine component, defines a weld path according to the gas turbine component contour, and calculates a trajectory for the robotic arm 12 to follow. In this context, the vision system identifies that an object in the vision window covers a relatively large area and verifies that the object is of interest by comparing it to a taught prototype. A contour specific to the component in the window is derived to calculate the trajectory. The vision system 20 communicates the calculated trajectory to the robotic arm 12 via the robotic arm controller 18. A main controller 22 communicates with the components of the system and includes conventional welding control systems such as arc length control, wire feed control, torch pulser control, pulser selection-panel and the like as shown.

The welding torch assembly 14 itself can be any available assembly that is suitable for the present application. Preferably, the welding torch assembly includes an arc length voltage controller, a wire feed guide and a plasma welding torch. Although a plasma welding torch is preferred, other weld torches could be used, such as a TIG torch or the like, and the invention is not necessarily meant to be limited to a plasma torch.

In defining the weld path, the vision system adds a sine wave with a set wavelength and a set amplitude to reduce heat input during welding and to provide a weld width sufficient for the gas turbine component being repaired/ refurbished. Optimum settings for the wavelength and amplitude are determined during development of the weld parameter recipe for the turbine component of interest, generally based on forward travel speed and component wall thickness.

In order to secure the gas turbine component for welding, a chill fixture 24 is disposed adjacent the robotic arm. Any suitable chill fixture such as a water-cooled chill fixture could be used to effect inter-pass temperature control. Preferably, the robotic arm is a 6-axis robotic arm such as Model RX130B with Model CS7B robotic arm controller available from the Staubli Company (www.staubli.com). A suitable wire feeder and a suitable arc length controller are available from the Jetline Corporation of California, U.S.A.

The welding process of the present invention is preferably conducted at room temperature, however, the system is suitable for elevated temperature welding as well. In order to facilitate room temperature welding, the gas turbine component to be welded may be subjected to a pre-weld heat treatment.

Figure 2:
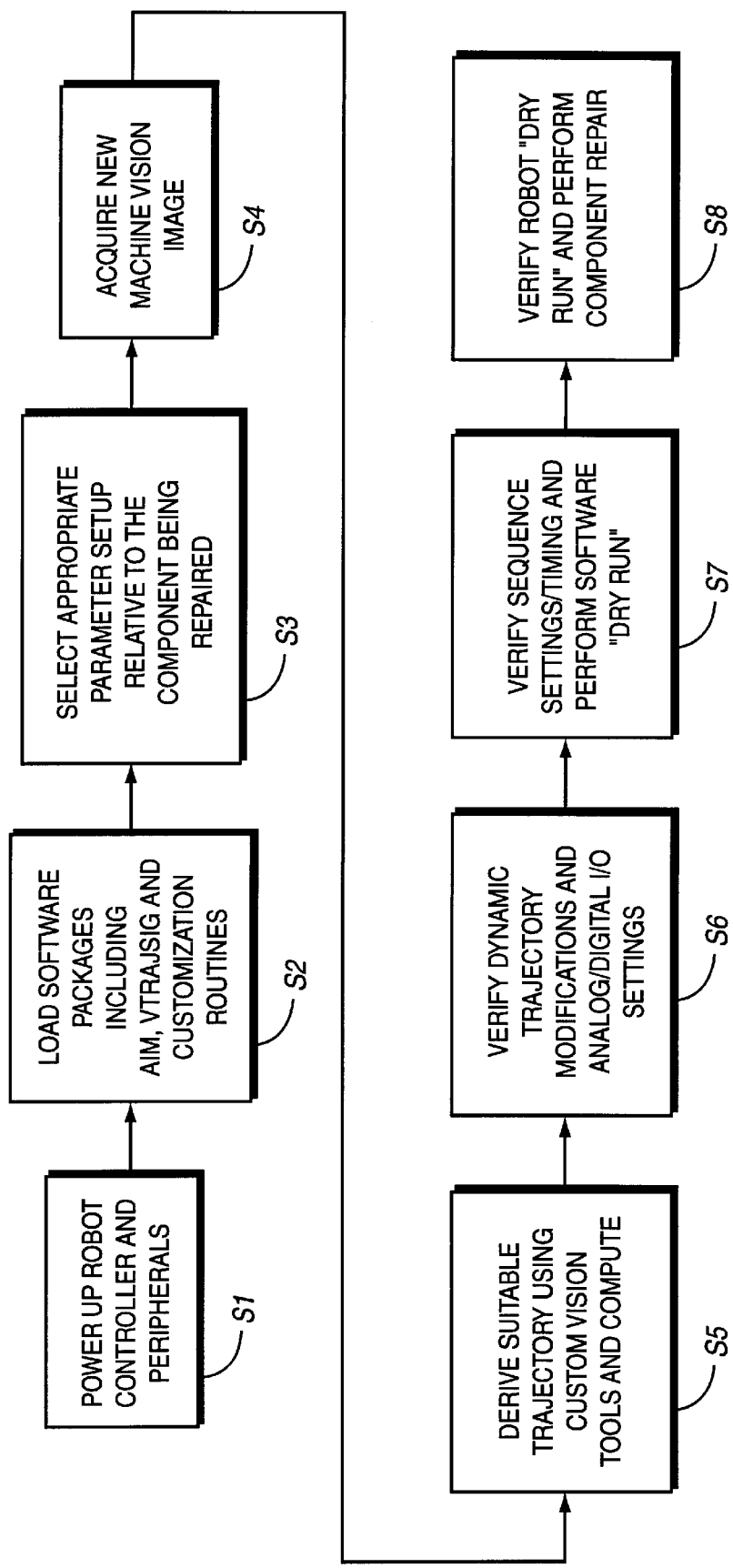
FIG. 2 is a flow chart of the process carried out by the system controller.

Referring to FIG. 2, the main controller 22 stores a control algorithm to effect the robotic welding process of the present invention. In step S1, the system powers up the robot controller and its peripherals. Software packages including AIM (Adept Information Management—a graphical user interface that runs on top of the operating system), Vtrajsig (from the Staubli Company—aids the user in creating and modifying trajectories relative to discrete points) and customization routines (such as customized software modules) are loaded (step S2). In step S3, an appropriate parameter set-up relative to the component being repaired is selected, and in step S4, a new machine vision image is acquired. In this context, a suitable camera for acquiring the image is the Panasonic MF602. The vision system then derives a suitable trajectory using custom vision tools in step S5 and verifies dynamic trajectory modifications and analog/digital I/O settings in step S6. The sequence settings/timings used by AIM software to structure program flow are verified and a software "dry run" is performed in step S7. Finally, in step S8, the robot "dry run" is verified and the component repair/refurbish process is performed.

EXAMPLE 1

A first stage turbine bucket was robotically processed using the apparatus of the present invention to weld repair the turbine bucket tip area. A weld filler was incorporated into the weld process. Any suitable weld filler could be used. The bucket was placed in the water-cooled chill fixture 24 for inter-pass temperature control and support to keep the bucket from moving during welding. The stationary camera mounted above the bucket took a picture and the vision system utilized image pixel data to generate a weld path relative to the bucket contour. A sine wave was then added with a wavelength of 1 mm and amplitude of 1.5 mm. This sine wave oscillation was used to reduce heat input to the part as well as provide a weld wide enough to meet final bucket tip dimensions after machining. The robotic arm 12, with the end of arm tooling including an arc link voltage control, wire feed guide and plasma welding torch, completed eight weld build-up passes to successfully restore the tip contour. The restored part was machined to final dimensions, vacuum heat treated at 2050° F. for two hours, and fluorescent penetrant inspected. No indications (cracks, porosity, etc.) were found. The part was also metallurgically examined for porosity and microcracks in the weld and/or HAZ (heat affected zone). No weld related defects were found.

EXAMPLE 2

An alternative first stage turbine bucket was robotically processed using the apparatus of the present invention to weld repair the turbine bucket tip area. A weld filler was used. The bucket was placed in a water-cooled chill fixture for inter-pass temperature control and support to keep the bucket from moving during welding. The stationary camera mounted above the bucket took a picture, and the vision system used image pixel data to generate a weld path relative to the bucket contour. A sine wave was then added with a wavelength of 1 mm and amplitude of 1.2 mm. The sine wave was reduced at the end of the weld to facilitate welding the walls together between the third and fourth cooling holes from the trailing edge. This sine wave oscillation was used to reduce heat input to the part as well as provide a weld wide enough to meet final bucket tip dimensions after machining. The robotic arm 12 with end of arm tooling including an arc length voltage control, wire feed guide and plasma welding torch, completed seven weld build-up passes to successfully restore the tip contour. The part was machined to final dimensions, vacuum heat treated at 2050° F. for two hours, and fluorescent penetrant inspected. No indications (cracks, porosity, etc.) were found with the exception of porosity in the casting about 1" below the trailing edge. The part was also metallurgically examined for porosity and microcracks in the weld and/or HAZ. No weld related defects were found.

With the system and method of the present invention, the first time yield through inspections operations such as FPI are increased by increasing repeatability and decreasing the variance of upstream weld repair operations. The apparatus including a robotic arm welder removes the previous manual welder, which was typically inconsistent in speed, filler feed rate, welding current, weld location and start/stop points. The apparatus of the invention preferably uses a 6-axis robot to insure precise speed (less than 10 inches per minute), a vision system that correlates part/robot locations (ensuring an accurate weld path for each individual part), and a controller that controls precise welding current and wire feed rates at exact locations during the weld path. By incorporating control of all these variables, decreased process variants and increased part yields can result. With this control, both ductile (IN-625, Hast X, etc.) and matching high strength fillers can be produced successfully and with repetition.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. A gas turbine component refurbishment apparatus comprising:

a robotic arm disposed adjacent the gas turbine component;

a welding torch assembly coupled to an end of the robotic arm;

a wire feeder cooperating with the welding torch assembly;

a robotic arm controller that communicates with the robotic arm, the robotic arm controller controlling a position of the robotic arm relative to the gas turbine component; and a vision system coupled with the robotic arm controller that identifies the gas turbine component, defines a weld path according to the gas turbine component contour, and calculates a trajectory for the robotic arm to follow, the vision system communicating the trajectory to the robotic arm.

2. A gas turbine component refurbishment apparatus according to claim 1, wherein the welding torch assembly comprises an arc length voltage controller, a wire feed guide, and a plasma welding torch.

3. A gas turbine component refurbishment apparatus according to claim 1, wherein the weld path comprises a sine wave with a set wavelength and a set amplitude to reduce heat input and to provide a weld width sufficient for the gas turbine component.

4. A gas turbine component refurbishment apparatus according to claim 1, further comprising a water-cooled chill fixture that secures the gas turbine component for welding and effects inter-pass temperature control.

5. A gas turbine component refurbishment apparatus according to claim 1, wherein the robotic arm is a six-axis robotic arm.

6. A method of refurbishing a gas turbine component using a robotic welding arm including a robotic arm, a welding torch assembly coupled to an end of the robotic arm, a wire feeder, a robotic arm controller, and a vision system, the method comprising:

securing the gas turbine component;

identifying the gas turbine component, defining a weld path according to the gas turbine component contour, and calculating a trajectory for the robotic arm to follow; and welding with the robotic arm and attached welding torch assembly along the weld path.

7. A method according to claim 6, further comprising, before the welding step, the step of adding a sine wave to the weld path with a set wavelength and a set amplitude.

8. A method according to claim 6, wherein the welding step comprises welding with an alloy weld filler wire.

9. A method according to claim 6, further comprising, after the welding step, machining the gas turbine component to final dimensions, vacuum heat treating the gas turbine component, and inspecting the gas turbine component.

10. A method according to claim 6, further comprising, prior to the securing step, the step of heat treating the gas turbine component for welding.

11. A method according to claim 10, wherein the welding step is performed at room temperature.

* * * * *